Patented Feb. 19, 1946

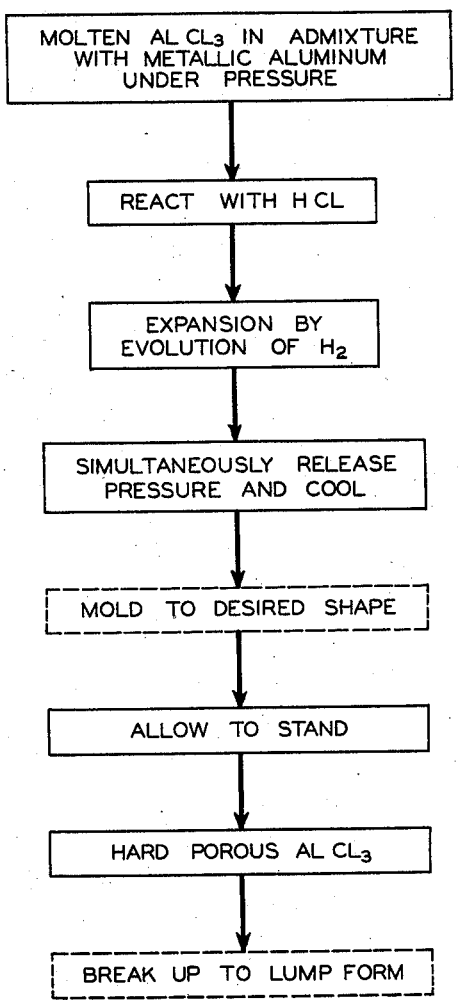

2,395,291

UNITED STATES PATENT OFFICE 2,395,291

CATALYSTS

Robert J. Patterson, Bartlesville, Okla., assignor to Phillips Petroleum Company, a corporation of Delaware Application June 20, 1942, Serial No. 447,806

2 Claims. (Cl. 252—259)

This invention relates to an aluminum chloride catalyst and more particularly to an improved process of making a porous aluminum chloride catalyst.

Aluminum chloride is a commonly used catalyst for organic reactions and especially for hydrocarbon conversion processes such as alkylation, isomerization, cracking, reforming, polymerization, condensation, reactions of the Friedel and Crafts type, etc. Up to the present time, it has been customarily used in two forms only. One is the ordinary commercially obtainable powdered material and the other is the form resulting when this powder is melted to a liquid, allowed to solidify and broken up into lumps resembling crushed limestone and varying in size say from one-half to four inches.

Numerous objections arise in the use of aluminum chloride in the physical forms just described. Neither form is well adapted to use as a stationary contact bed through which the reactants pass, the powdered form because it is relatively impervious en masse and is floated away by the reactants and the fused form because of its small surface area and the relative imperviousness of the individual lumps to the reactants.

The principal object of the present invention is to provide a process of making an aluminum chloride catalyst of high porosity and great effectiveness. Another object is to more positively produce porous aluminum chloride. Another object is to generate hydrogen in aluminum chloride by forming hydrogen chloride by reacting a part of the aluminum chloride with water and reacting the resulting hydrogen chloride with metallic aluminum. Another object is to provide such a process which is economical and easy to carry out, which involves the use of only materials which are readily available, and which results in the production of reaction products which are harmless to the aluminum chloride and to the reactants and reaction catalyzed therewith. In fact the principal reaction product of my process is aluminum chloride which functions as additional catalyst and which may frequently be even more active than ordinary commercial aluminum chloride by virtue of its having been formed in nascent state and often in a more highly extended state than the main body of the aluminum chloride. Another object is to provide a more vesiculated form of aluminum chloride in which the gas and aluminum chloride phases are more extensively and intimately interlaced, that is, more truly spongy and less truly cellular so that the activity of the resulting catalyst is greater and the aluminum chloride is more fully and effectively utilized. Still another object is to provide a process of the foregoing type which leaves residual metallic aluminum in the resulting catalyst and thereby add further to its utility in many reactions. Another object is to provide a process of the foregoing type which leaves the pores of the catalyst filled with hydrogen gas or hydrogen chloride or both. Numerous other advantages will more fully hereinafter appear.

The accompanying self-explanatory drawing portrays diagrammatically one mode of practicing my invention. Optional steps are enclosed in dotted lines.

In accordance with my invention, porous aluminum chloride is prepared by taking a body of molten aluminum chloride and leavening and expanding it to porous form by the generation of hydrogen gas in situ by the action of anhydrous hydrogen chloride upon metallic aluminum, in particulate form, that is in the granular, powdered, flaked, etc. state, and distributed throughout the body of the molten or liquid mass. Upon cooling the resulting mass it assumes a spongy, solid form sufficiently rigid to enable it to be used as packing material in reaction towers, to be handled in the ordinary manner, etc.

If desired, the resulting solidified sponge may be crushed or ground to any desired size. Alternatively the molten, expanded spongy, frothy or foamy mass may be reduced to solidified particulate form in any other manner, for example, by passing the expanded liquid mass into a suitable cooling liquid, preferably anhydrous, such as a hydrocarbon liquid or other suitable organic liquid, which may or may not be volatile, and which preferably is a non-solvent for aluminum chloride.

The leavening reaction in accordance with my invention is:

$$2Al + 6HCl \rightarrow 2AlCl_3 + 3H_2\uparrow$$

The hydrogen gas so liberated causes the molten mass to become spongy and vesiculated, and highly extended with finely interlaced phases of gaseous hydrogen and liquid aluminum chloride; upon cooling the molten spongy mass assumes a rigid solid state preserving the porous structure.

If desired the spongy vesiculated nature of the mass may be increased or accentuated still further by releasing the pressure on the expanded molten mass down to atmospheric pressure simultaneously with the cooling so as to cause any hydrogen cells or dissolved gas to expand outwardly until they reach the surface of the mass.

Its porosity may be even further increased by running a stream or body of the molten expanded mass into a cooling body of relatively cold volatile organic liquid which is preferably substantially a non-solvent for the aluminum chloride and which is anhydrous. Or the porous spongy nature of the aluminum chloride may be enhanced in any other desired way in conjunction with the practice of my invention without departing from the spirit thereof. For example, a small amount of a volatile organic liquid soluble in aluminum chloride at the elevated temperatures under consideration may be incorporated with the molten mass and upon expansion allowed to still further expand the material.

Usually the molten mass will be at a temperature ranging from about 195° to about 300° C. and preferably from about 195° to about 225° C. in order to minimize the elevated pressure required to prevent volatilization. This temperature may be maintained in any suitable manner as by a heating jacket surrounding the pressure-resisting treating vessel, heating coils in the body of the treating vessel, etc.

Generally, I find it necessary to carry out the melting under and to maintain a pressure sufficiently elevated to prevent excessive volatilization of the aluminum chloride. Usually moderately elevated pressures of from about 10 to about 300 pounds per square inch gage will be employed. The generation of hydrogen by the reaction noted above may increase the pressure somewhat.

The particulate aluminum may be intimately distributed throughout the molten mass of aluminum chloride in any suitable manner. For example, it may be thoroughly intermixed with the dry powdered aluminum chloride, after which heat is applied to melt the aluminum chloride and the remainder of my process performed. Or the aluminum powder or the like may be added to an already molten mass of aluminum chloride and stirred thereinto. Alternatively, previously prepared granular aluminum chloride in which have been embedded metallic aluminum particles (that has been made in any suitable manner, for example, by cooling and granulating the mixtures just described) may be re-melted and subjected to the process of the present invention. Molten aluminum chloride containing the necessary metallic aluminum may be prepared in any other suitable manner, and the foregoing illustrative methods are by no means to be considered as limiting. For instance, it is conceivable that the mixture of aluminum chloride and metallic aluminum might be prepared by the incomplete reaction of metallic aluminum with chlorine or hydrogen chloride in known manner to give aluminum chloride.

The amount of metallic aluminum incorporated with the aluminum chloride may vary between wide limits depending upon many factors, among which are the extent of leavening effected, upon the pressure employed, upon whether it is desired that free aluminum remain in the product, the amount of free aluminum so desired as a residue, etc. The amount of aluminum reacted with hydrogen chloride in the leavening or pore-forming reaction may range from about 0.02 to about 0.2 per cent by weight of aluminum based on the weight of aluminum chloride, to give an expansion of from about 120% to about 300% by volume based on the volume of the original aluminum chloride. However, I may use from 0.02 to 5% of aluminum, since the excess does no harm but may be beneficial.

The amount of expansion effected will usually be between about 120% and about 300% by volume. In other words, the volume of the product will range from 1.2 to 3 times the volume of ordinary lump, fused aluminum chloride. However, values on either side of the range specified may be obtained, if desired, by suitable operation of the process.

It is frequently desirable to leave free or unreacted metallic aluminum in the product. This may be most conveniently done by using an excess of the aluminum. This free aluminum exerts a beneficial effect in many reactions, such as alkylation of aliphatic and aromatic hydrocarbons, acylation (such as benzoylation of benzene), polymerization of olefins, isomerization of aliphatic hydrocarbons and other reactions heretofore catalyzed with aluminum chloride, especially where hydrogen chloride is used as a promoter for the aluminum chloride. The metallic aluminum prevents cracking, and other undesirable side reactions, apparently by combining or reacting with a portion of the hydrogen halide promoter and thereby moderating the catalytic activity of the aluminum chloride. Also the hydrogen liberated in the conversion reaction by reaction of the free aluminum with the promoter acts as a reducing agent, thus further retarding the formation of cracked products. The amount of free aluminum so left in the product of my invention may vary within extremely wide limits from none to 100% by weight of the aluminum chloride. If desired, free aluminum in an amount corresponding to that to be left in the product may be stirred into the molten partially expanded liquid product after subsidence of the initial leavening reaction but before release of pressure and solidification of the expanded mass by cooling.

The use of powdered aluminum in conjunction with my porous aluminum chloride catalyst, as, for example, in the manner just described or in any other manner, may be particularly advantageous in catalyzing certain reactions where the reaction would otherwise be objectionably violent due to the very highly extended nature of my catalyst.

The metallic aluminum used as a pore-forming reagent in accordance with my invention may prevent or reduce the corrosive action of metallic materials of construction otherwise corroded by the molten aluminum chloride and the hydrogen chloride. This corrosion reduction is accentuated when an excess over theoretical of aluminum is used with a view to leaving metallic aluminum in the product, and the product so prepared with free aluminum retains this property when used in the subsequent reaction catalyzed with the product.

In melting the aluminum chloride and leavening it in accordance with my invention it is maintained at an elevated pressure sufficiently high to prevent excessive volatilization of the aluminum chloride and keep most or all of it from subliming to the vapor state. This may be accomplished by confining the mass being melted or leavened in a suitable closed pressure-resisting vessel and allowing the pressure of the aluminum chloride vapor and/or the liberated hydrogen to build up therein to the desired extent. Alternatively the aluminum chloride, with or without the powdered aluminum, may be melted or confined in liquid form in a suitable pressure-resisting vessel in an atmosphere of a suitable inert gas under pressure sufficient to prevent excessive vaporization. Examples of suitable gases are nitrogen, hydrogen, methane, anhydrous hydrogen chloride, anhydrous hydrogen bromide, anhydrous hydrogen iodide, etc. In the case of the hydrogen halides, the gas may be fed into the pressure-resisting vessel under elevated pressure and simultaneously reacted with the aluminum metal already placed in admixture in the molten aluminum chloride. Or the aluminum chloride may be melted or confined in molten form under an atmosphere of such a hydrogen halide, preferably anhydrous hydrogen chloride, under pressure, whereupon the metallic aluminum powder may be introduced in any suitable manner to effect the generation of the leavening hydrogen gas.

The pressure built up or maintained over the molten aluminum chloride undergoing treatment will usually be moderate, say from about 10 to about 300 pounds per square inch gage. If desired, the pressure may be maintained at a constant figure by provision of suitable relief or bleed-off means for the treating vessel.

The process of my invention may be carried out either batchwise or continuously. Apparatus for continuous operation may be somewhat more difficult to design and more expensive than batch equipment but presents a number of well-known advantages thereover.

With the molten aluminum chloride and the powdered aluminum, anhydrous hydrogen halide, preferably the chloride, is contacted in any desired manner while maintaining the pressure. The reaction between the powdered aluminum and the hydrogen halide immediately ensues, causing the generation of hydrogen gas under pressure. The mixture may be stirred during the reaction, if desired, to distribute the hydrogen chloride to all parts of the mixture.

Alternatively the molten aluminum chloride may be maintained in contact with anhydrous hydrogen chloride under pressure, whereupon the aluminum powder may be introduced with stirring to cause the aluminum to be dispersed throughout the mass and cause consequent generation of the hydrogen in every part of the mass.

The reaction is facilitated by the action of the hydrogen chloride in dissolving in the molten aluminum chloride thereby distributing it uniformly even without stirring. The dissolution may or may not be attributable to the formation of a loose complex between the hydrogen chloride and the aluminum chloride. In any event, whether solution is simple physical solution or is due in part to reaction, substantial amounts of the hydrogen chloride do dissolve in the aluminum chloride at the pressures and temperatures involved and are thus uniformly presented to the aluminum powder. As fast as the dissolved hydrogen chloride is used up by the reaction, more immediately dissolves in its place. The reaction between the hydrogen chloride and the aluminum takes place very rapidly, apparently being highly catalyzed by the aluminum chloride present. The high temperature also facilitates the reaction.

After the reaction between the hydrogen chloride and the aluminum metal has proceeded to the desired extent, usually to the point where whichever of these reagents is present in less than equivalent proportions is completely reacted, the pressure on and the temperature of the mass are quickly reduced in such manner as to cause still further and maximum expansion due to the release of pressure and solidification of the mass to retain the expanded form.

In the expansion step, the pressure is preferably reduced to substantially atmospheric. The temperature is quickly reduced to at least slightly below, the solidification temperature, usually to 170° C. or below whereupon the mass solidifies in expanded form. The temperature may thereupon be carried down to atmospheric. Preferably the temperature and the pressure are reduced simultaneously.

The resulting material is a porous or spongy plastic mass. This plastic mass may be shaped into any desired form without destruction of its porosity. The mass hardens in a short time, the hardened mass retaining its porosity.

If an excess of hydrogen chloride was used, the residual hydrogen chloride may serve as a promoter in reactions catalyzed by aluminum chloride.

While specific temperatures and pressures have been given, the invention is by no means limited thereto since other temperatures and pressures may also be satisfactory if chosen in proper relation to each other.

The aluminum chloride may contribute further to the pore formation. Thus, when the pressure on and temperature of a molten mass of aluminum chloride are quickly reduced, the aluminum chloride tends to sublime, forming pores as it passes from the superheated liquid state to the solid state, provided the proper relation of temperature and pressure is maintained during the step.

Apparently the plastic mass of aluminum chloride obtained is an allotropic form of aluminum chloride since it may be readily molded and shaped at atmospheric temperature for a short time after its preparation, after which it slowly hardens to a solid state.

Any inert gas which is used, the hydrogen chloride used, and the hydrogen generated by the leavening reaction are dissolved in and also occluded in the molten mass of aluminum chloride under pressure. Upon release of this pressure this gas or mixture of gases is released, forming bubbles or pores. Preferably the mass is simultaneously cooled sufficiently to retain the bubbles in the resulting plastic mass.

The mechanical strength of the ultimate product may vary, roughly inversely, with the porosity, the exceedingly porous material occasionally having insufficient strength for some purposes. The porosity of the product will vary with the amount of hydrogen liberated in the reaction described and also with the rate of release of pressure, being greater the more rapid the release of pressure. As pointed out above, simultaneously with the reduction of pressure the temperature is reduced in such relationship therewith that the hydrogen gas and any other gaseous material present therewith expand to form pores of the desired size that are retained in the mass.

From the drawing it will be seen that my process may comprise the steps of first bringing together in any suitable manner molten aluminum chloride under pressure, particulate metallic aluminum, and hydrogen chloride and then, preferably after one or the other or both of the pore-forming reactants—aluminum and hydrogen chloride—have been used up, simultaneously lowering the temperature of and pressure upon the molten mass to convert it to solid, porous, expanded form. Upon cooling, there is obtained a plastic porous mass. Advantage may be taken of the plasticity of this form of aluminum chloride when first prepared to mold it into any desired shape, such as pellets, saddles, rings, discs, etc.

Upon standing for a few hours the material hardens and any shape impressed upon it will be permanently retained.

If desired, the hard porous aluminum chloride mass may be finally crushed or broken to any desired size or form.

In catalytic reactions, such as isomerization and alkylation, as well as in other organic reactions that are catalyzed by aluminum chloride, the surface of the catalyst is an important factor. Catalysts have heretofore often been placed on inert supporting materials in order to increase their surface areas. The porous form of aluminum chloride described herein has unusual catalytic activity because of its highly extended surface and its spongy nature. Since it also has reasonably good structural strength, it is possible to use it directly as a catalyst without an inert support.

The process of my invention may be and frequently will be conducted entirely in the absence of water, by using anhydrous components or reagents, namely anhydrous aluminum chloride, anhydrous hydrogen chloride and dry aluminum, and by preventing contact with water or moisture during the treatment. After preparation, suitable known precautions may be taken to keep the product anhydrous and to protect it from extended deleterious contact with atmospheric air or other source of moisture.

If desired, however, the reaction may be carried out in the presence of small amounts of water, the action of which will be to still further catalyze the reaction. Thus the aluminum chloride, the aluminum, or the hydrogen chloride may not be entirely dry but may contain traces of water, which will accelerate the reaction.

Or the hydrogen chloride necessary for the leavening reaction may be formed in situ by the introduction of water in any form to the molten aluminum chloride, the aluminum being already present, added subsequently, or added simultaneously with the water. The added water reacts with the aluminum chloride to give aluminum oxide, which is a harmless filler component, and hydrogen chloride, which then is free to react with the metallic aluminum to liberate hydrogen gas. The necessity for introduction of hydrogen chloride is thus avoided. Each mol of water so added liberates two mols of CHl, so that the amount of water need be only one-half of the molecular equivalent of hydrogen chloride which it is desired to have present. Usually an excess of HCl over aluminum will not be desired when practicing this embodiment of the invention, in order to avoid excessive loss of original aluminum chloride. The number of mols of water so added will be 1.5 times the number of mols of aluminum desired to be reacted and exactly equal to the number of mols of hydrogen gas desired to be liberated as leavening gas.

The reactions involved in the modification just described are:

$$2AlCl_3 + 3H_2O \rightarrow Al_2O_3 + 6HCl \quad (1)$$
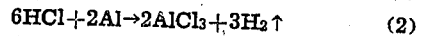
$$6HCl + 2Al \rightarrow 2AlCl_3 + 3H_2 \uparrow \quad (2)$$

The product prepared in accordance with my invention has an apparent density of not over about 80% of that of ordinary lump, fused aluminum chloride. The apparent density may be lower than this down to even as low as 30% of lump, fused material. The product is porous in the true sense, that is, spongy. The cells are interconnecting so that reactants may pass completely through a lump, granule, or molded piece of the product. In other words, the product consists of two continuous interlacing phases, one of solid aluminum chloride and the other of gas. This is apparently because the bubbles of gas formed in the treatment expand during the release of pressure and continue to do so until they merge with one another and reach the exterior surface of the mass. This type of product is to be distinguished from a truly cellular material wherein the gas cells or pockets do not interconnect. Such a truly cellular material without interconnecting pores, while light in weight and a good heat insulator, would, because of its impervious nature, not be particularly advantageous as a catalyst unless crushed rather finely to expose its highly extended surface. However, such cellular material presents the advantage that in view of its light weight it can be packed to great depth in a reaction column or can be readily suspended in a suspension medium for use in slurry form or in so-called "fluid catalyst" reactions.

The cooling should be carried to a point below the solidification point of the molten aluminum chloride, usually to at least about 170° C. The temperature to which it is cooled may range therefrom down to 100° C. and down to about atmospheric temperature. Shaping of the plastic porous mass may be facilitated somewhat by the use of moderately elevated temperatures insufficient to cause consolidation or compaction under the desirably moderate shaping pressure employed.

Likewise the release of pressure is preferably carried to substantially atmospheric, although depending upon the rapidity of cooling, the cooling curve (time-temperature), and the temperature to which the mass is cooled, it may occasionally be carried to pressures somewhat above atmospheric but substantially below the pressure attained before release of pressure and cooling.

It is preferred not to draw a vacuum upon the mass during the pressure release where so doing would cause individual cells under reduced pressure to form. Such cells are less desirable because they are not interconnecting and do not extend to the surface so that the mass obtained is not of maximum utility as a catalyst material. Also such cells may contract upon exposure of the mass, either in plastic or in liquid form, to atmospheric pressure. Where it is possible to draw a vacuum on the mass during the processing and still produce a satisfactorily porous mass, such a step may be practiced without departing from the spirit of the inventive concept.

The time of cooling and release of pressure will vary widely depending upon the inter-relation of temperature and pressure maintained and numerous other factors. In general it will not exceed about 30 minutes and may vary therefrom down to the point where it is substantially instantaneous, say taking place in from about one-tenth of a second to about 5 seconds. The rapidity of release of pressure and of cooling will depend upon the desired porosity and structural strength or crushing resistance of product. Selection of suitable time of cooling, time of release of pressure, and values of temperature and pressure will be within the skill of the art in the light of my disclosure.

When operating batchwise, I may use a bomb or other suitable pressure-resisting vessel equipped with means for releasing the pressure and simultaneously cooling. The pressure-release means may be either of the type adapted to continuously relieve all pressure in excess of a predetermined level or of the type adapted to allow pressure to build up during the reaction part of my process and to relieve it at any predetermined rate during the cooling step. To cool the bomb it may be removed from immersion in the heating medium and placed in a cooling medium. Or it may be cooled by a suitable heat-exchange medium circulated in a jacket, cooling pipes or the like in place of the heating medium used to effect melting.

Alternatively I may discharge the reacted hydrogen-containing molten mass under pressure through an orifice into an expansion chamber maintained at a lower pressure, whereby expansion and solidification are effected. I may use a plunger and cylinder analogous to the arrangement used in injection molding of plastics, the molten reaction mass being extruded under pressure of the plunger through a nozzle into an expansion chamber or mold at low pressure. The mold may be cooled in any desired manner and the volume of the mold cavity will be substantially greater than the volume of the reaction mass injected thereinto so as to allow for expansion to the desired extent. Also I may carry out the reaction and melting in a cylinder equipped with one or two plungers and then withdraw one or both of the plungers to allow expansion, accompanied by rapid cooling as by passing a cooling medium around the cylinder. Still further I may use an extrusion type of apparatus equipped with means for melting the aluminum chloride and carrying out the pore-forming reaction while confining the mass under gaseous or mechanical pressure or both at least sufficient to prevent excessive vaporization of aluminum chloride, and also with an extrusion screw for forcing the reacted mixture through an orifice into an expansion chamber as before. Such a device might be similar to the extrusion molding equipment used in handling plastics and synthetic resins.

Instead of operating in a batchwise manner, I may carry out my process continuously in suitable apparatus designed for the purpose. Thus, when using an extrusion machine equipped with a pressing screw rotated continuously, I may make provision for feeding the components and reactants into one portion of the machine and carrying out the gas-generating reaction, either in an initial portion of the screw chamber or in a separate chamber communicating therewith and discharging thereinto, without disturbing the maintenance of pressure on the reacting mixture and on the reacted mixture being extruded. Or I may use a plurality of injection plungers operating in injection cylinders connected to a common expansion orifice and chamber and alternately pushed in and retracted for a new charge. I may use any suitable equipment for continuously producing the molten reacted mass under pressure and pumping it under pressure into a suitable expansion chamber.

It will be understood that materials of construction suitably resistant to the action of molten aluminum chloride and hydrogen chloride will be employed in the construction of apparatus for carrying out the present invention.

While hydrogen chloride is the preferred hydrogen halide, under some circumstances I may use hydrogen bromide or iodide in place thereof. As used herein and in the claims the term "hydrogen halide" includes these three compounds. Hydrogen fluoride, whether anhydrous or containing a small amount of water, is not satisfactory.

Following hereinafter are illustrative non-limiting examples of the process of the present invention.

Example I

Fifteen hundred grams of powdered commercial anhydrous aluminum chloride are intimately admixed with 2.6 grams of metallic aluminum powder. The resulting mixture is melted under pressure of dry nitrogen at 20 pounds per square inch gage and brought to a temperature of 200° C. Anhydrous hydrogen chloride under pressure of 50 pounds per square inch gage is then introduced into the pressure-resisting treating vessel, the amount of hydrogen chloride so introduced being considerably in excess of that which is stoichiometrically equivalent to the metallic aluminum. The mixture is agitated to cause the hydrogen chloride to intimately contact all parts thereof. The temperature is maintained at 200° C. and the pressure at 50 pounds per square inch. All of the aluminum reacted with the hydrogen chloride, forming hydrogen gas and causing the pressure to build up slightly. After reaction was complete the vessel was cooled to 170° C. and the pressure simultaneously bled off to atmospheric over a period of 2 minutes. Upon cooling down to atmospheric temperature, there was obtained a plastic porous sponge. Upon standing 24 hours in a dry inert atmosphere it hardened to rigid form. The product had a volume of 2900 cc. The amount of aluminum reacted (2.6 gms.) was 0.173% by weight of the aluminum chloride.

Example II

One thousand grams of anhydrous aluminum chloride powder was placed in a closed pressure-resisting vessel in an atmosphere of nitrogen. Anhydrous hydrogen chloride was then introduced to the vessel in the amount of 1.69 grams. Dry aluminum powder in the amount of 0.43 gram was then added to the closed vessel and mixed with the aluminum chloride powder by shaking the vessel. The mixture was then heated to 225° C. while stirring, to melt the aluminum chloride. Leavening took place due to the generation of hydrogen bubbles. Upon completion of the reaction the accumulated pressure was bled off and the mass cooled simultaneously to 160° C. over a period of three minutes. A plastic porous sponge was obtained which hardened to rigid form upon standing. The volume was 1050 cc.

Example III

Example II was duplicated exactly except that 50 grams of the aluminum powder was employed. By virtue of the limitation of the amount of hydrogen chloride, only about 0.43 gram of the aluminum was reacted. The remainder was uniformly distributed throughout the spongy product.

Example IV

Two thousand grams of powdered anhydrous aluminum chloride was melted and brought to 200° C. under pressure of nitrogen at 50 pounds per square inch gage. To the melt was added with stirring 0.35 gram of very finely divided dry aluminum powder without releasing the pressure. Anhydrous hydrogen chloride in an amount of 100 grams was then introduced, the pressure being maintained. Reaction ensued, the pressure being allowed to build up and the temperature being held at 200° C. The pressure was then released to atmospheric and the temperature simultaneously reduced to 120° C., the time being 10 seconds. Upon cooling to atmospheric temperature in the resulting inert atmosphere of nitrogen and residual hydrogen chloride and allowing to stand, a hard porous mass occupying 1630 cc. was obtained.

Example V

One thousand grams of powdered anhydrous aluminum chloride was intimately admixed with 1.8 grams of aluminum powder. The material was confined under nitrogen gas at 20 pounds per square inch gage during the mixing. The mixture was then heated to 210° C. to melt the aluminum chloride. Thereupon 1.8 grams of water in the form of steam was introduced, to liberate hydrogen chloride and effect reaction thereof with the aluminum to form the leavening hydrogen. After reaction was complete the pressure which had built up was reduced to atmospheric and the temperature simultaneously reduced to 160° C. over a period of one minute. Upon cooling down further and hardening, a spongy mass occupying 2100 cc. was obtained.

Example VI

Powdered anhydrous aluminum chloride in intimate admixture with 1% of powdered dry aluminum by weight based on the weight of the aluminum chloride is fed continuously by means of a barrel valve which may be gas-tight, if desired, or by a totally enclosed screw conveyor or equivalent device from a closed hopper, which may be under pressure of an inert gas, into an elongated melting and reaction vessel where an atmosphere of anhydrous hydrogen chloride is maintained under pressure. The reaction vessel desirably is sealed and provided with gas-tight feeding means and, if desired, with gas-tight withdrawal means. After melting of the aluminum chloride at 225° C. and reaction have taken place the reacted mixture is continuously withdrawn at the exit end of the reaction vessel as by expansion under the pressure of the gases in the reaction vessel through one or a plurality of orifices or nozzles into an expansion chamber or chambers which are maintained under a suitably relatively low pressure and wherein an atmosphere of inert gases is maintained. The inert gases referred to may be those evolved in the expansion, namely, excess hydrogen chloride and some of the hydrogen which escapes. From the expansion chamber or chambers the porous material is withdrawn continuously to suitable storage receptacles, or may be aged at atmospheric or moderately elevated temperatures to harden and rigidify the material.

If desired, by proceeding in the foregoing manner but using extremely fine outlet orifices, porous threads of the aluminum chloride may be made.

In this example, more of both aluminum and of hydrogen chloride than necessary to give the porosity desired was used. However, the excess hydrogen generated as a result did no harm.

Example VII

Example VI was duplicated exactly except that no extraneous hydrogen chloride was introduced. Instead the atmosphere maintained in the melting and reaction vessel contained nitrogen and steam in such proportions that the proper portion of the aluminum chloride was continuously decomposed by the steam to give off enough hydrogen chloride to combine with one fifth of the aluminum (0.2% by weight of the aluminum chloride) leaving four-fifths unreacted in the product. In other words the weight of steam reacted was continuously equal to the weight of aluminum to be reacted (0.2% by weight of the $AlCl_3$). The atmosphere in the expansion chamber was free from water by virtue of the fact that all of the water had reacted prior to entry thereinto.

Example VIII

Powdered anhydrous aluminum chloride was placed in a closed pressure-resisting vessel. Anhydrous hydrogen chloride under pressure occupied the interstices of the aluminum chloride mass and the space thereover. The temperature of the vessel and contents was then raised to 225° C. to melt the aluminum chloride and cause the hydrogen chloride to dissolve to a substantial extent in the molten aluminum chloride. A charge of aluminum powder was then quickly introduced into the vessel without interference with the pressure and stirred rapidly throughout the molten mass to cause the hydrogen-generating reaction to take place. The pressure was maintained or allowed to build up and the temperature was held at about 225° C. during the reaction. Upon completion of the reaction, the pressure was rapidly released to atmospheric and the temperature simultaneously reduced to 160° C. A porous mass resulted.

The metallic aluminum employed will usually not exceed 10 mesh and preferably is considerably finer, say 100 mesh down to 300 mesh. Where reference is made herein to "metallic aluminum," "particulate aluminum," etc., I intend to include any form of particle, such as powder, flake, turnings, chips, shavings, granules, etc.

I claim:

1. A process of producing a porous spongy aluminum chloride catalyst of increased catalytic activity and which also contains metallic aluminum, which comprises subjecting a mixture of aluminum chloride and a small proportion of particulate aluminum metal comprising about 0.02 to 5.0 per cent by weight of the aluminum chloride to melting at a super-atmospheric pressure of about 10 to 300 pounds per square inch gage, intimately mixing such an amount of hydrogen chloride gas with said molten mixture that a portion of the aluminum metal is converted to aluminum chloride in an amount equivalent to from approximately 0.02 to approximately 0.2 per cent by weight of the aluminum chloride in the molten mixture and hydrogen gas is concomitantly and simultaneously liberated throughout the molten mass and produces an expansion thereof, and subsequently releasing the pressure and rapidly cooling and solidifying said mass while retaining its expanded form to produce a porous spongy mass of catalytically active aluminum chloride.

2. The process according to claim 1, in which the hydrogen chloride is generated in situ by the introduction of sufficient water into the molten mass to react with the aluminum chloride to form hydrogen chloride which in turn reacts with the metallic aluminum to liberate hydrogen.

ROBERT J. PATTERSON.